(12) United States Patent
Kolesar (10) Patent No.: US 11,382,305 B2
(45) Date of Patent: Jul. 12, 2022

(54) PET TOY AND MEAL FEEDER

(71) Applicant: Susan Lynn Kolesar, South Plainfield, NJ (US)

(72) Inventor: Susan Lynn Kolesar, South Plainfield, NJ (US)

( * ) Notice: Subject to any disclaimer, the term of this patent is extended or adjusted under 35 U.S.C. 154(b) by 121 days.

(21) Appl. No.: 17/068,484

(22) Filed: Oct. 12, 2020

(65) Prior Publication Data

US 2022/0046895 A1 Feb. 17, 2022

Related U.S. Application Data

(60) Provisional application No. 63/066,606, filed on Aug. 17, 2020.

(51) Int. Cl.
*A01K 5/01* (2006.01)
*A01K 15/02* (2006.01)

(52) U.S. Cl.
CPC .......... *A01K 5/0114* (2013.01); *A01K 15/025* (2013.01)

(58) Field of Classification Search
CPC ... A01K 5/0114; A01K 15/025; A01K 15/026
See application file for complete search history.

(56) References Cited

U.S. PATENT DOCUMENTS

| 6,688,258 | B1 | 2/2004 | Kolesar | |
| 6,990,762 | B1* | 1/2006 | Muday | G09F 19/02 |
| | | | | 40/406 |
| 9,999,199 | B1* | 6/2018 | Dadalto | A01K 15/021 |
| 2008/0083378 | A1* | 4/2008 | Pearce | A01K 5/0114 |
| | | | | 119/707 |
| 2011/0297093 | A1* | 12/2011 | Lai | A01K 5/0114 |
| | | | | 119/54 |
| 2015/0128875 | A1* | 5/2015 | Christianson | A01K 5/0275 |
| | | | | 119/707 |
| 2015/0359195 | A1* | 12/2015 | Day | A01K 15/025 |
| | | | | 119/51.01 |
| 2016/0165840 | A1* | 6/2016 | Graves | A01K 5/0114 |
| | | | | 53/473 |
| 2016/0255805 | A1* | 9/2016 | Jones | F16M 11/041 |

\* cited by examiner

*Primary Examiner* — Trinh T Nguyen
(74) *Attorney, Agent, or Firm* — Walter J. Tencza, Jr.

(57) ABSTRACT

An apparatus including a cap section; a central section; a container section; and a first inner object. The cap section is configured to removably attach to a first end of the central section. The container section is configured to removably attach to a second end of the central section. The second end of the central section opposes the first end of the central section. The first inner object fits through a first opening of the central section into an inner chamber of the central section. The first opening of the central section is located at the second end of the central section. The first inner object does not fit through a second opening of the central section; and the second opening of the central section is located at the first end of the central section. The container section may be measuring cup including pet treats.

21 Claims, 11 Drawing Sheets

PET TOY AND MEAL FEEDER

CROSS REFERENCE TO RELATED APPLICATION(S)

The present application claims the priority of U.S. provisional application Ser. no. 63/066,606, titled "MEAL FEEDER AND TREAT DISPENSING DEVICE FOR PETS", filed on Aug. 17, 2020, inventor and applicant Susan Lynn Kolesar.

FIELD OF THE INVENTION

This invention relates to pet toys and meal feeding devices.

BACKGROUND OF THE INVENTION

There are various known dog meal feeders and treat dispensing toys on the market. One of these is based on U.S. Pat. No. 6,688,258, to Kolesar, which appears in the market as the "Tug a Jug" toy. The "Tug a Jug" toy was often too hard to load due to treats falling out through the neck of the bottle as they were being loaded or during screwing on the narrow cap. In addition, the threads were difficult to align and/or the cap was fragile and cracked easily, rendering the toy useless and dangerous.

The "Tug a Jug" toy also had a rope which was found to be dangerous in that a pet could fling and toss the device around causing damage to the pet, persons around the area of play, or home furnishings. The rope also had a tendency to get moldy and was also dangerous because a dog would destroy and eat the rope causing a health threat to the pet. In addition, while the rope served as an obstacle so that treats wouldn't fall out too easily through the neck of the bottle, the obstacle of the rope was essentially fixed in place, clogging up the opening at the neck of the bottle making it too difficult to get treats to come out of the bottle and significantly limiting the size of treats and kibble that could be utilized with the toy since the rope itself took up a great deal of the opening through which the treats exited the toy.

SUMMARY OF THE INVENTION

One or more embodiments of the present invention provide a container section that is a twist and lock cap for connecting to a central or main section. The main or central section may have a neck having an opening through which food treats for a pet are dispensed and/or loaded.

A ball shell section, covering or lid may be used to protect the neck of the main or central section and/or serves as a reservoir to collect food or pet treats that the pet will eventually try to get out of inner chambers of the overall apparatus through manipulation by the pet.

The main or central section and/or the container section may be surrounded by a band, sleeve, or material wrap to reduce noise as the overall apparatus or pet toy is used on a hard flooring.

The removable band or sleeve protects both the overall pet toy or apparatus and indoor flooring and furniture of a person's home while also reducing noise levels when the pet is using the apparatus. The removable band or sleeve it typically may be washable, such as machine washable, for easy cleaning. The band or sleeve may be fixed to the central section and/or the container section and/or to the overall apparatus, or may be removably attached. In one or more embodiments, the pet toy can be used with or without the band or sleeve.

One or more embodiments of the present invention provide a ball shell section or ball shell cap which is more substantial than in the prior art and has an inner area or chamber to hold food treats for a pet.

The inner area of the overall pet toy and/or apparatus can be used to hold separate and larger biscuits or other larger items which are larger than the opening of the ball or cap section, so that a pet cannot obtain these larger items, without a human separating the container section from the central section.

One or more embodiments of the present invention provide a twist and lock feature for connecting a container section to a central section as opposed to multiple thread screw top used in other pet toys.

One or more embodiments of the present invention provide one or more internal balls inside an inner chamber of a pet toy so that treats in the inner chamber do not come out too easily. Different levels of difficulty may be provided by using no internal balls, one ball, or two balls. The inner balls are free to move throughout the majority of inner chambers of the central section and the container section, thereby keeping the opening through which the treats are obtained by a pet, free from permanent obstruction. Unlike the rope of the prior known "Tug a Jug" product, a pet cannot access these inner balls once the overall apparatus is assembled by the individual, with the inner balls in the inner areas of the overall apparatus, and therefore the inner balls do not pose a danger to the pet. Additionally, the inner balls can be removed by a human individual for cleaning as to mitigate any concerns of mold that occurred with the rope of the prior "Tug a Jug" product.

In at least one embodiment, the inner balls may be, or may be replaced by inner objects which are not balls, wherein the inner objects have a largest dimension which is larger than the inner diameter of an opening at a neck of a bottle or central section of the overall apparatus. The inner objects are free to move throughout the majority of inner chambers of the central or bottle section and the container section, but typically cannot exit the inner chambers of the central or bottle section, without disconnecting the central or bottle section from the container section.

In one or more embodiments, it is preferred and critical that the container section serve as a measuring cup and scoop for pet treats and kibble and unlike the prior known "Tug a Jug" product, since the treats are typically loaded into the container section/measuring cup and not the central section, the overall apparatus of one or more embodiments of the present invention is easier to load.

In at least one embodiment, an apparatus is provided comprising: a cap section; a central section; a container section; and a first ball.

In at least one embodiment, the cap section is configured to removably attach to a first end of the central section; the container section is configured to removably attach to a second end of the central section, wherein the second end of the central section opposes the first end of the central section; the first ball is configured to fit through a first opening of the central section into an inner chamber of the central section; the first opening of the central section is located at the second end of the central section; the first ball is configured so that it does not fit through a second opening of the central section; and the second opening of the central section is located at the first end of the central section.

The apparatus may further include a plurality of treats; wherein each of the plurality of treats is configured to fit through the second opening of the central section.

The apparatus may further include a sleeve which is configured to surround the central section, and to inhibit a portion of the central section from contacting a floor surface.

The container section may be measuring cup. The cap section may be shaped substantially in the form of a spherical shell. The cap section may have an inner chamber having an inner diameter which is greater than a diameter of the second opening of the central section. The first ball may be less than half of an inner diameter of an inner chamber of the container section.

The sleeve may have a height when attached to and surrounding the central section, such that the height of the sleeve is at least half of the height of the central section from the first end of the central section to the second end of the central section.

In at least one embodiment, a diameter of the second opening of the central section is less than half a diameter of the first opening of the central section.

In at least one embodiment, the central section has a single ridge located at the first end; and the cap section is configured to attach to the first end of the central section by a slot of the cap section mating with the single ridge, by pushing the cap section onto the central section, without rotating the cap section with respect to the central section.

The container section may have a height; wherein the central section has a cylindrical portion having a height, which is aligned with the height of the container section when the container section is attached to the second end of the central section; and wherein the height of the container section is at least half of the height of the cylindrical section of the central section.

In at least one embodiment of the present invention, an apparatus is provided comprising a cap section; a central section; and a container section; wherein the cap section is configured to removably attach to a first end of the central section; wherein the container section is configured to removably attach to a second end of the central section, wherein the second end of the central section opposes the first end of the central section; wherein the container section is a measuring cup; and wherein the central section is a bottle having an first opening at the second end of the central section.

The container section may have a height; wherein the central section has a cylindrical portion having a height, which is aligned with the height of the container section when the container section is attached to the second end of the central section; and wherein the height of the container section is at least half of the height of the cylindrical section of the central section.

In at least one embodiment of the present invention, a method is provided comprising: placing a plurality of treats into a container section, wherein the container section is a measuring cup; removably attaching the measuring cup to a first end of a central section; and wherein the central section is a bottle, with a neck at the second end and a bottom at the first end, and having a first opening at the first end of the central section, and having a second opening at the neck of the central section.

The method may also include placing one or more inner balls into the measuring cup before removably attaching the measuring cup to the first end of the central section; and wherein each of the one or more inner balls has an outer diameter which is larger than a first opening at the neck at the second end of the central section so that each of the one or more inner balls cannot pass through the first opening at the neck at the second end of the central section; and wherein each of the plurality of treats is dimensioned so that each of the plurality of treats can pass through the first opening at the neck at the second end of the central section.

The method may further include placing a sleeve so that the sleeve surrounds the central section, and inhibits a portion of the central section from contacting a floor surface.

The method may further include removably attaching a cap section to a second end of the central section, which is opposite the first end of the central section. The cap section may be shaped substantially in the form of a spherical shell. The cap section may have an inner chamber having an inner diameter which is greater than a diameter of the first opening of the central section. Each of the one or more balls may be less than half of an inner diameter of an inner chamber of the container section.

DETAILED DESCRIPTION OF THE DRAWINGS

Figure 1:
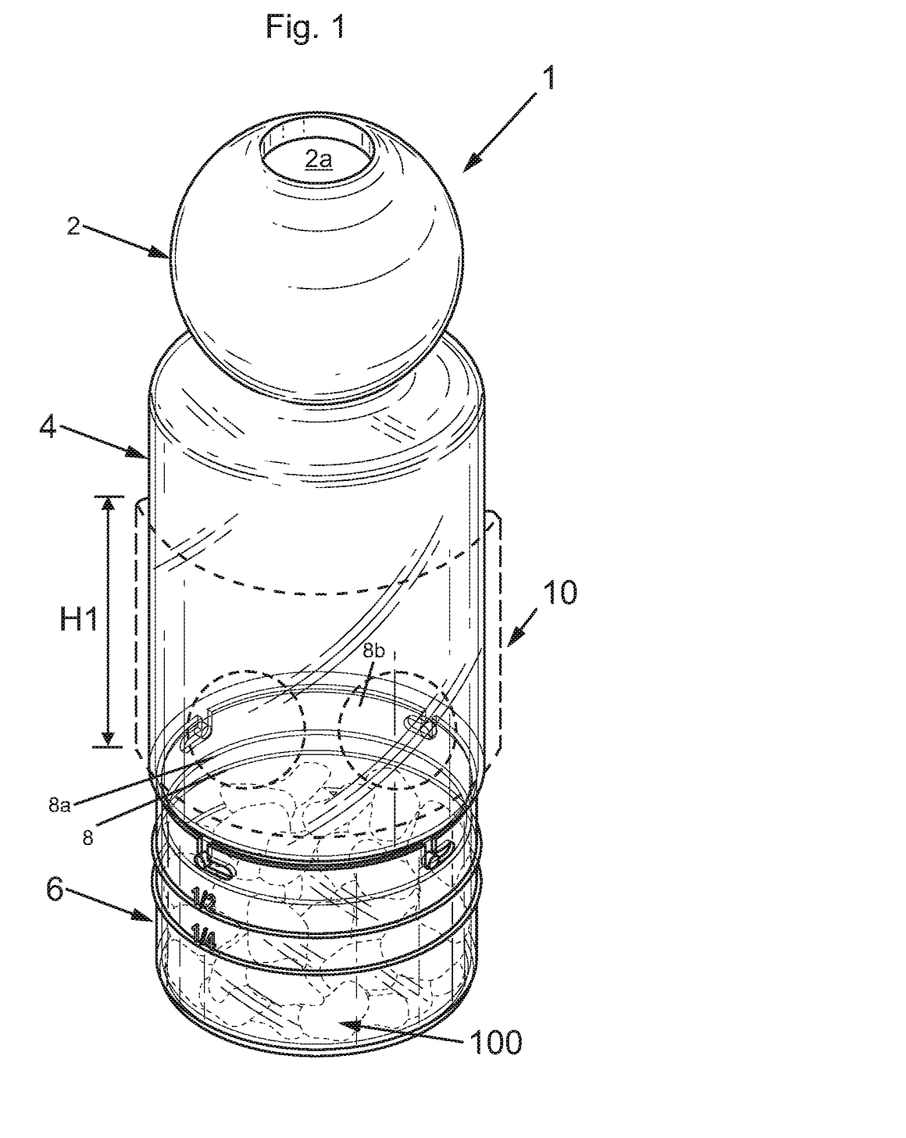
FIG. 1 is an assembled front, right, and top perspective view of a pet toy in accordance with an embodiment of the present invention, along with treats inside the pet toy.
Figure 2:
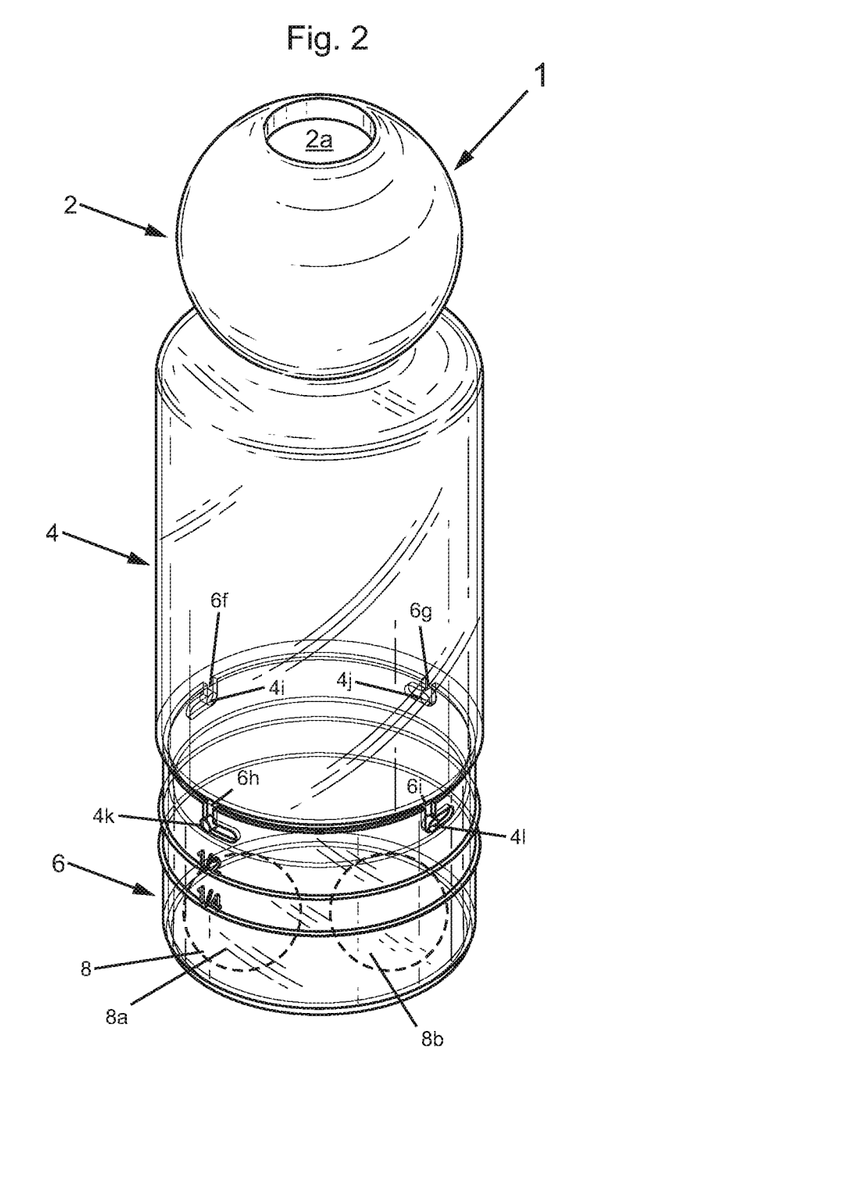
FIG. 2 is an assembled front, right, and top perspective view of the pet toy of FIG. 1, without treats inside the pet toy.

FIG. 1 is an assembled front, right, and top perspective view of a pet toy 1 in accordance with an embodiment of the present invention, along with treats 100 inside the pet toy, wherein the treats 100 are shown by dashed lines. FIG. 2 is an assembled front, right, and top perspective view of the pet toy 1 of FIG. 1, without treats 100 inside the pet toy 1.

Figure 3:
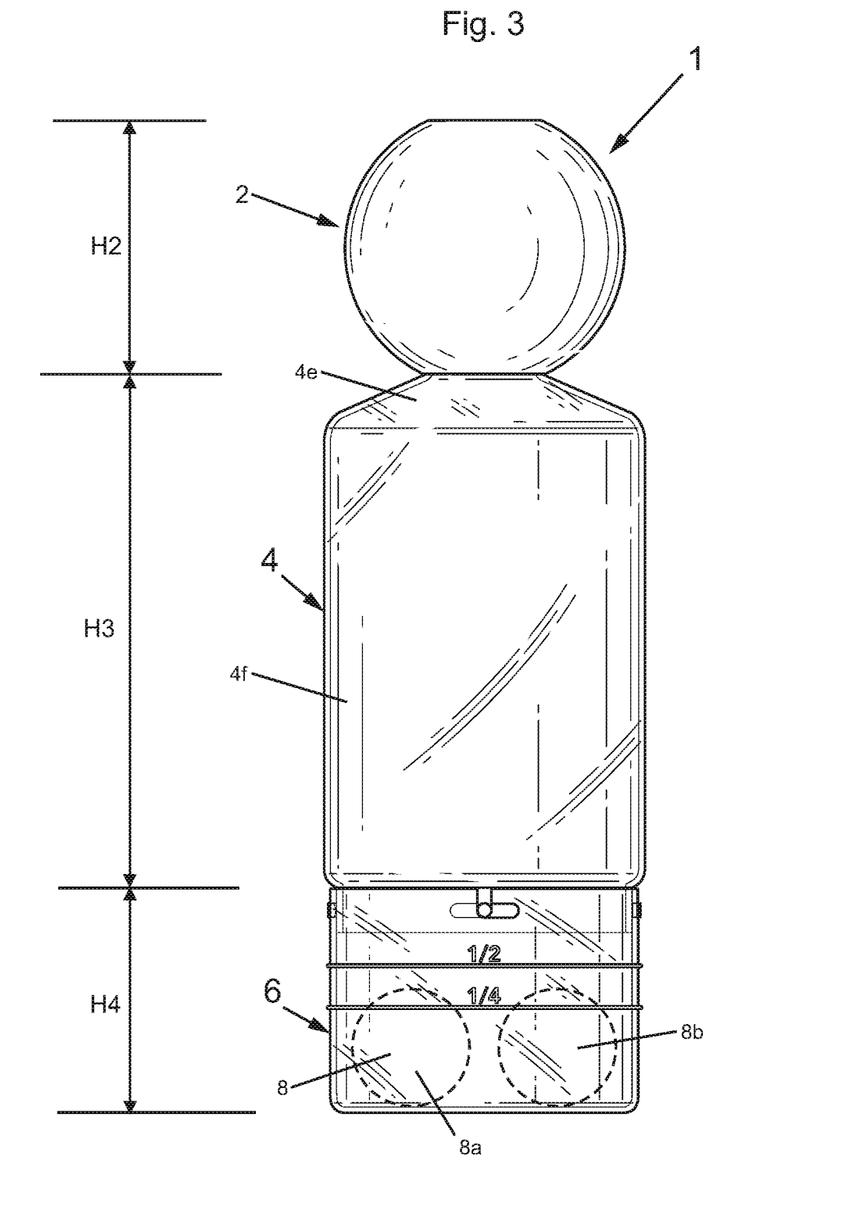
FIG. 3 is a front elevational view of the pet toy of FIG. 1.
Figure 4:
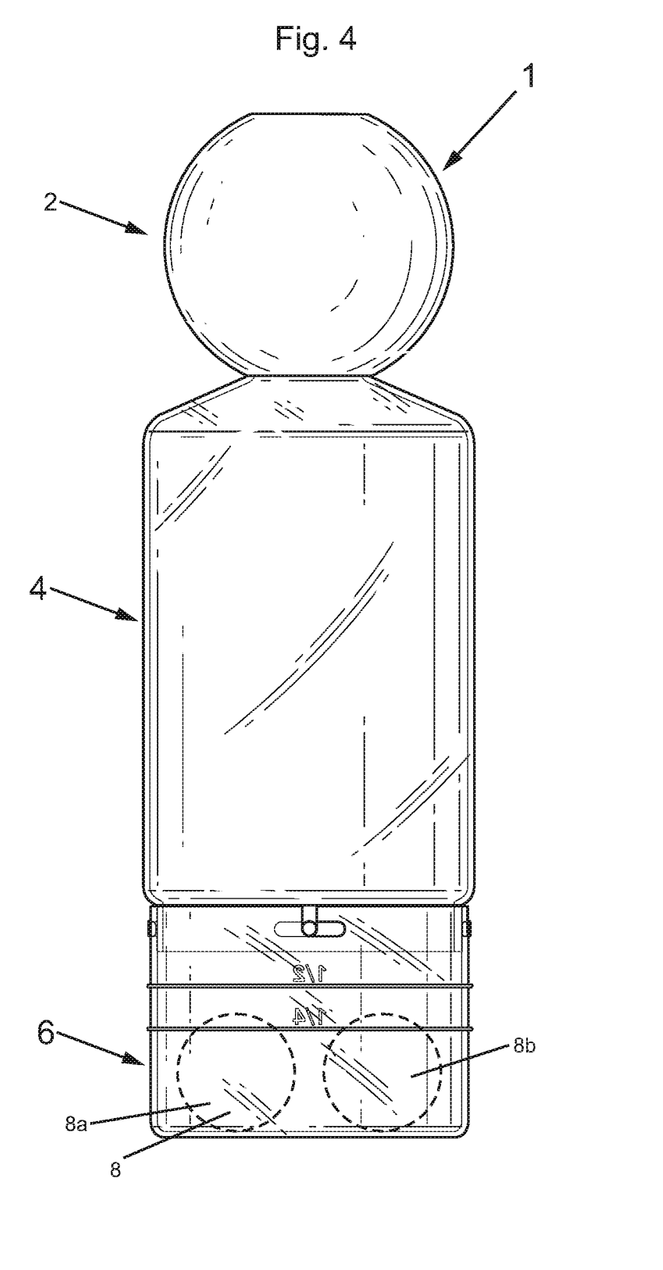
FIG. 4 is a rear elevational view of the pet toy of FIG. 1.
Figure 5:
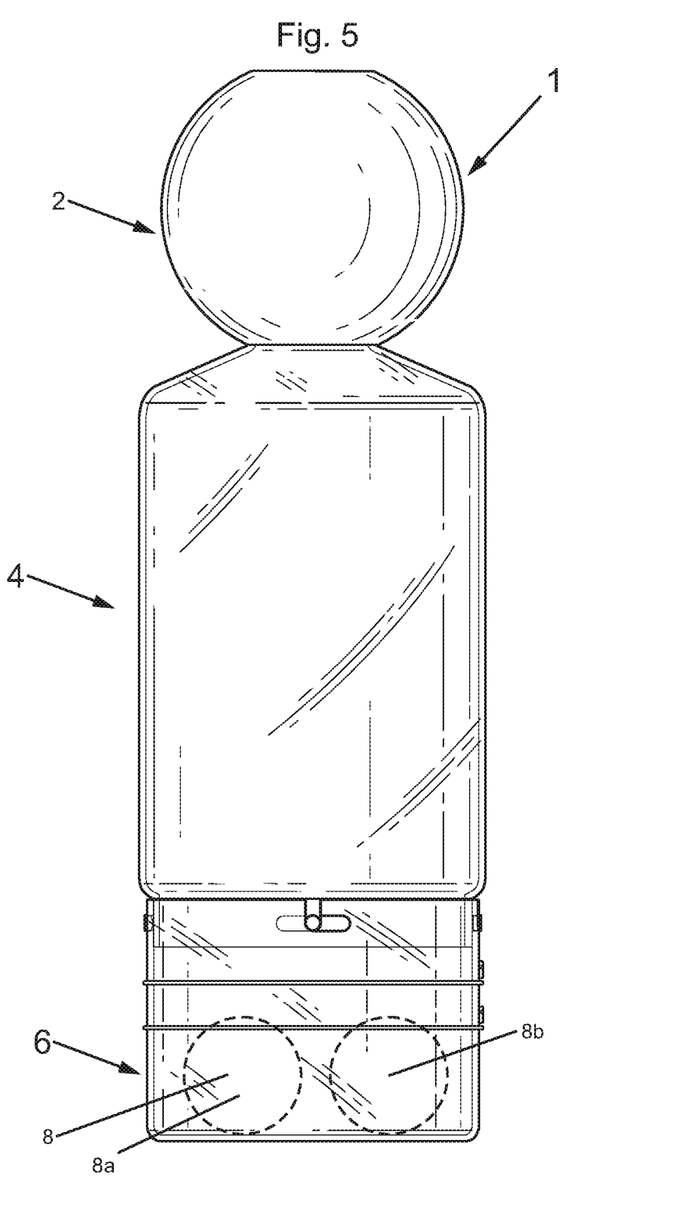
FIG. 5 is a left side elevational view of the pet toy of FIG. 1.
Figure 6:
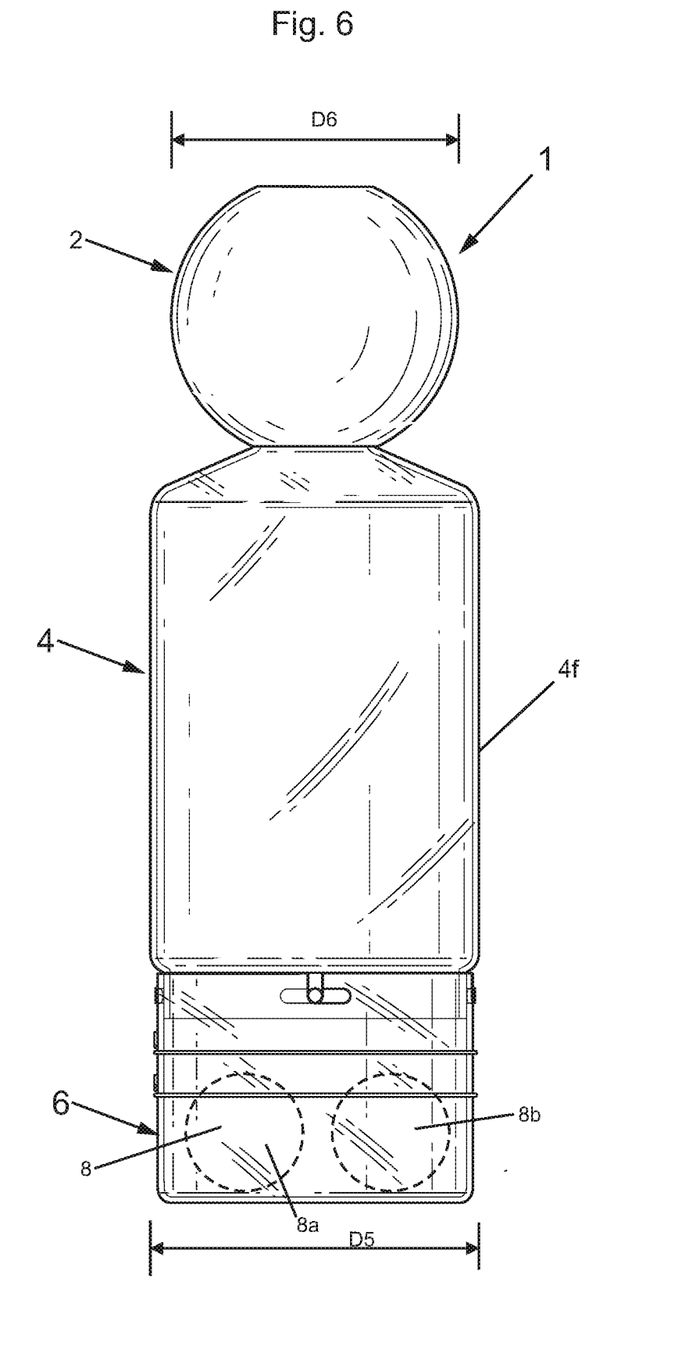
FIG. 6 is a right side elevational view of the pet toy of FIG. 1.
Figure 7:
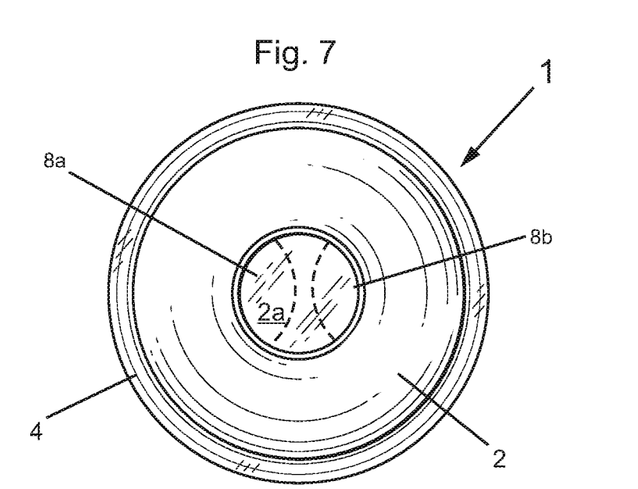
FIG. 7 is a top plan view of the pet toy of FIG. 1.
Figure 8:
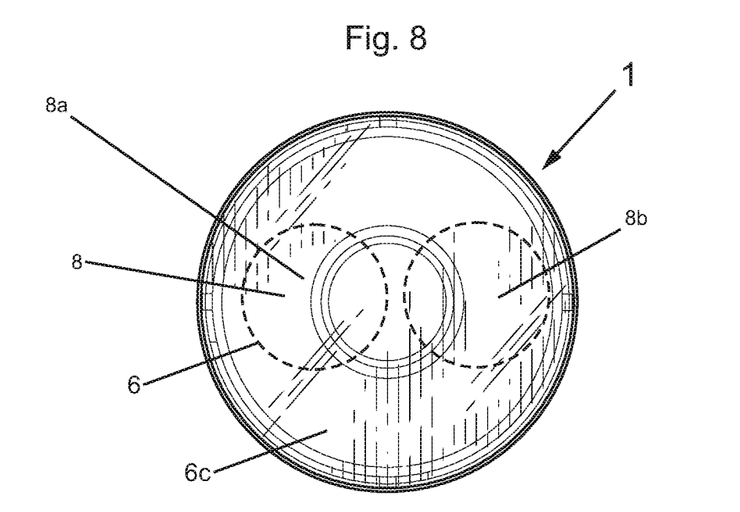
FIG. 8 is a bottom plan view of the pet toy of FIG. 1.
Figure 9:
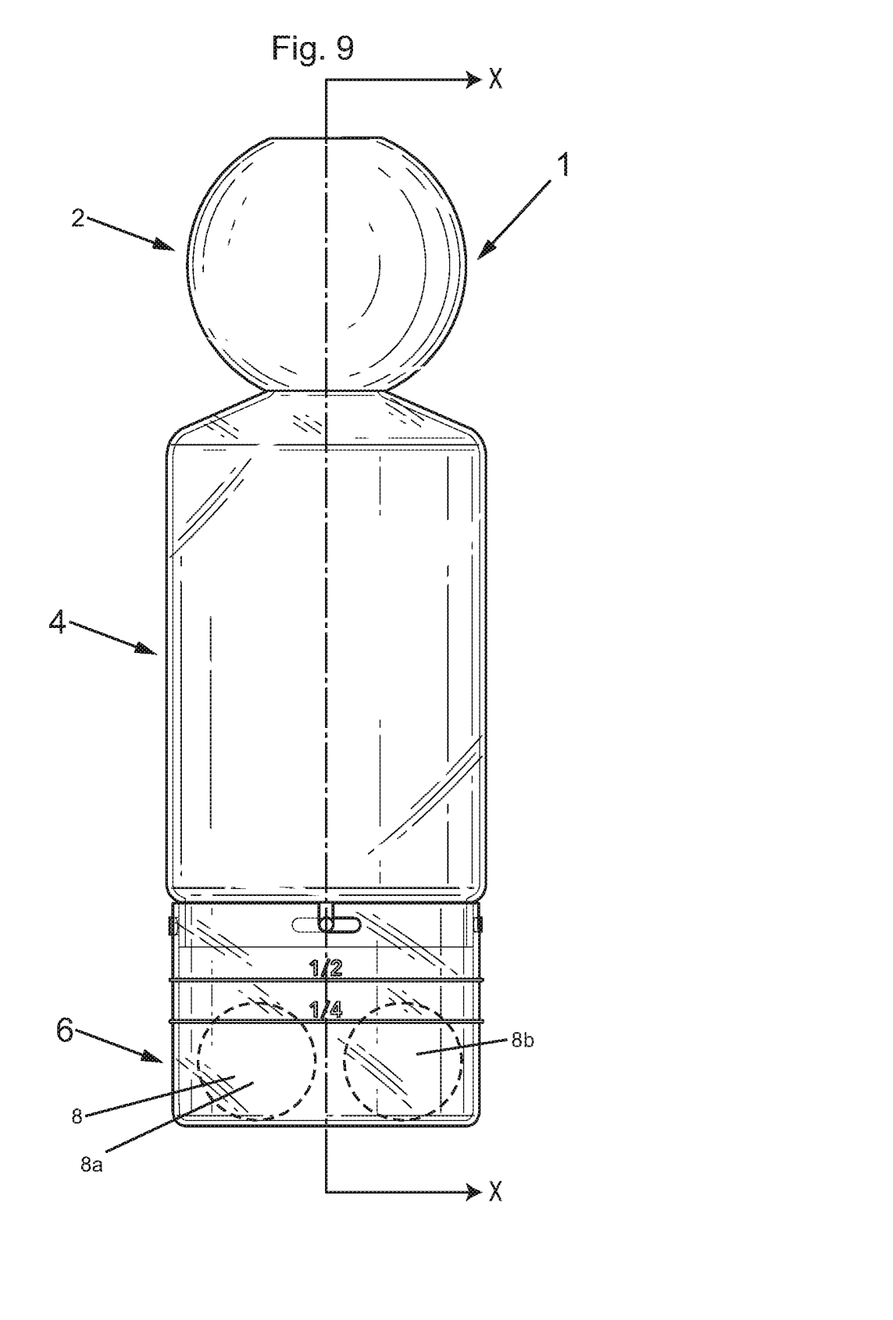
FIG. 9 is a front elevational view of the pet toy of FIG. 1 with a line xx shown going through the center.
Figure 10:
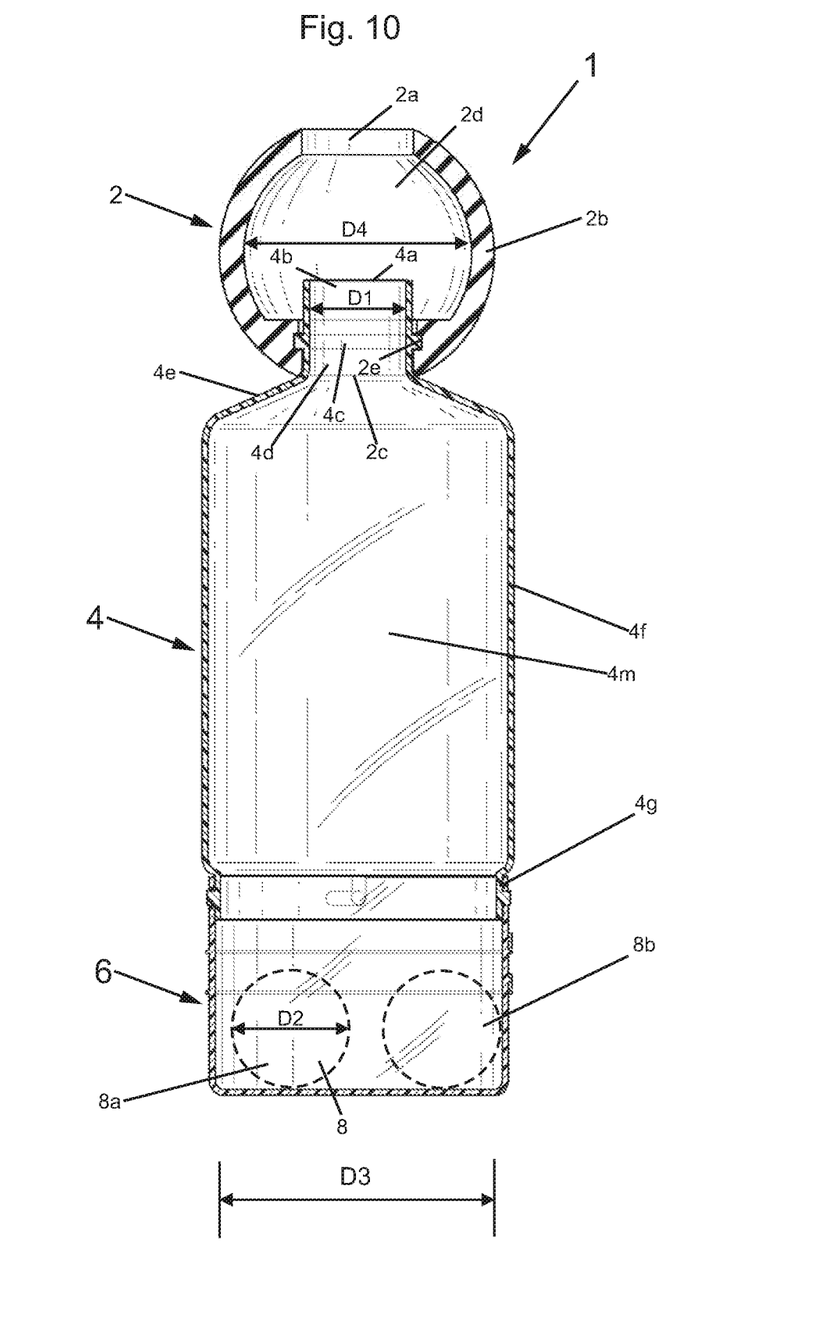
FIG. 10 is a sectional view of the pet toy of FIG. 1, along the line xx.
Figure 11:
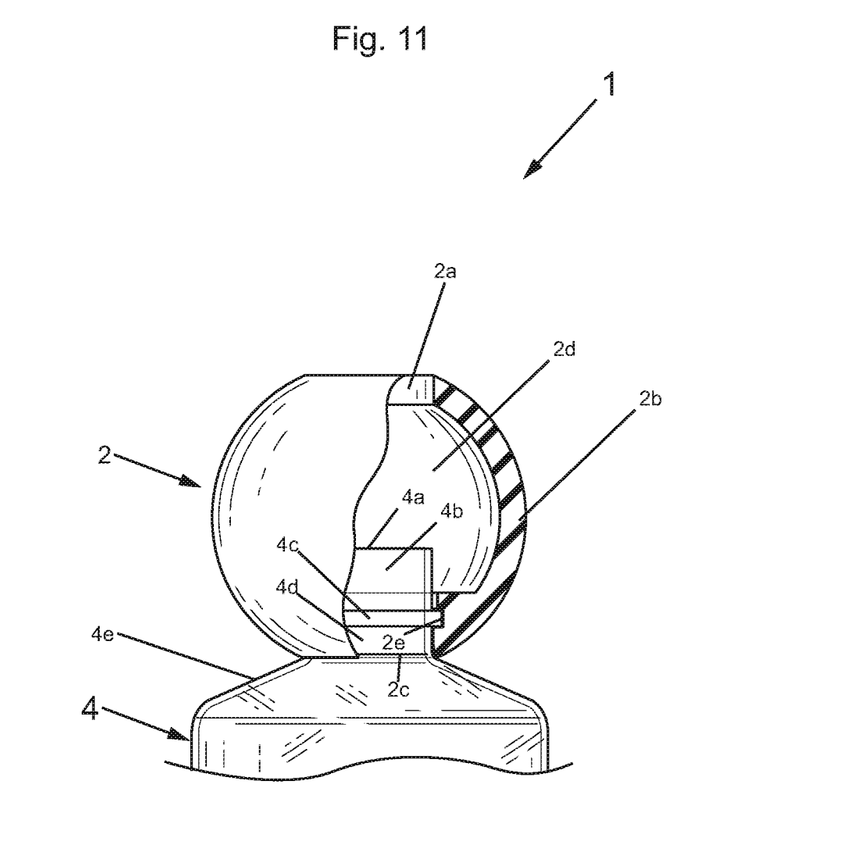
FIG. 11 is a partial cutout sectional view of part of the pet toy of FIG. 1.
Figure 12:
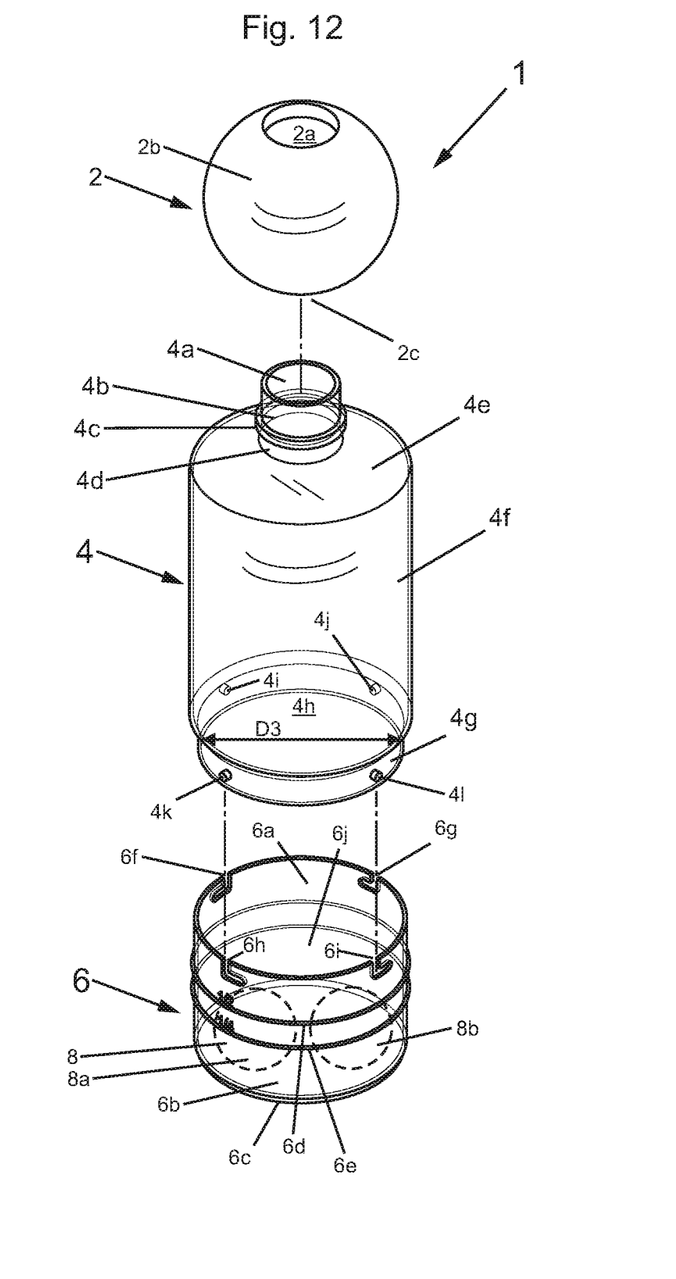
FIG. 12 is an exploded front, right, and top perspective view of the pet toy of FIG. 1, with components of the pet toy taken apart from each other.

FIG. 3 is a front elevational view of the pet toy 1. FIG. 4 is a rear elevational view of the pet toy of FIG. 1. FIG. 5 is a left side elevational view of the pet toy 1. FIG. 6 is a right side elevational view of the pet toy 1. FIG. 7 is a top plan view of the pet toy 1. FIG. 8 is a bottom plan view of the pet toy 1. FIG. 9 is a front elevational view of the pet toy 1 of FIG. 1 with a line xx shown going through the center. FIG. 10 is a sectional view of the pet toy 1 of FIG. 1, along the line xx shown in FIG. 9. FIG. 11 is a partial cutout sectional view of part of the pet toy 1 of FIG. 1. FIG. 12 is an exploded front, right, and top perspective view of the pet toy 1 of FIG. 1, with components of the pet toy 1 taken apart from each other.

Referring to FIG. 12, the pet toy 1 includes ball section 2, a central section 4, and container section 6.

The ball section 2 has a top opening 2a shown in FIG. 12, and a bottom opening 2c shown by FIGS. 10-12. The ball section 2 has a shell 2b shown in FIG. 12, and an inner chamber 2d as shown by FIGS. 10 and 11. The inner chamber 2d has an inner diameter D4, shown in FIG. 10, and it is critical in at least one embodiment, that D4 be greater than D1, which is the diameter of the top opening 4a at one end of the central section or bottle section 4. This allows treats of treats 100, to come out of the central section 4 through opening 4a, and pass into the inner chamber 2d, and rattle around inside the inner chamber 2d, when a pet is manipulating the assembled pet toy 1 and trying to get a treat of treats 100. This presents a further challenge for the pet and attract the pet's attention.

The central section 4 includes a top opening 4a, a portion 4b, a ridge 4c, a portion 4d, a top wall or shoulder portion 4e, a peripheral or body portion wall 4f, a section 4g, a bottom opening 4h, and protrusions or posts 4i, 4j, 4k, and 4l which protrude from and are fixed and/or integrated with section 4g as shown in FIG. 12. The central section 4 also has an inner chamber 4m, within the portions 4b, ridge 4c, top wall 4e, peripheral wall 4f, and section 4g, as shown by FIG. 10.

In at least one embodiment, the central section 4 is transparent.

The container section 6 has a top opening 6a shown in FIG. 12 and a solid bottom surface or solid covering 6c shown in FIG. 8. The container section 6 includes capital L shaped slots 6f, 6g, 6h, and 6i, each of which has a vertical leg or portion integrated with a horizontal leg or portion. The container section 6 also includes peripheral lines or ridges 6d and 6e, which are used to measure quantities of treats 100 to be placed in an inner chamber 6j of the container 6, shown in FIG. 12. The inner chamber 6j is bound by a peripheral wall 6b as well as the solid bottom surface or covering 6c.

In operation, an individual places pet treats 100 into the inner chamber 6j of the container 6, through the top opening 6a, when the container section 6 is separate from the components 2 and 4, with the container bottom surface 6c, oriented on and parallel to a ground surface.

With the treats 100 in the inner chamber 6j, the container section 6 is then connected to the central section 4 by sliding the protrusions or posts 4i, 4j, 4k, and 4l, into the bottom of the vertical legs of slots 6f, 6g, 6h, and 6i, respectively, as shown in FIG. 2. Thereafter the container section 6 can be put into a locked state with respect to the central section 4 by rotating the container section 6, clockwise, with respect to the central section 4 to cause the protrusions or posts 4i, 4j, 4k, and 4l to slide horizontally into the rightmost portion of horizontal legs of the capital L-shaped slots 6f, 6g, 6h, and 6i, respectively.

The ball section 2 may then be connected to the central section 4 as shown in FIGS. 2-6, and FIGS. 10-11. It is critical in at least one embodiment that the ball section 2 be made entirely of a flexible, resilient material, such as rubber, which allows the ball to be snapped or flexed onto the top of the central section 4 as shown in FIGS. 10-11. The ball section 2 has an inner groove or slot 2e shown in FIGS. 10-11, which typically traverses a circular area within the ball section 2. The ridge 4c of the central section 4 mates with the inner groove 2e of the ball section 2 to removably attach the ball section 2 to the central section 4, as shown by FIGS. 10-11.

The structure and method for removably attaching the ball section 2 to the central section 4 in at least one embodiment is preferred and critical, because the ball section 2 is not screwed onto the central section 4, and it is difficult for an animal to detach the ball section 2 from the central section 4. However, in alternative embodiments, the ball section 2 may be attached to the central section 4 in other ways.

The ball section 2 may be connected to the top of the central section 4 first, and then the combination of sections 2 and 4 may be connected to the container section 6.

With the pet toy or apparatus 1 assembled and with pet treats 100 inside the inner chambers 6j and/or 4m, and or the inner chamber 2d of ball 2, a pet may be given the apparatus 1 to play with. The pet will typically manipulate the pet toy or apparatus 1, to obtain one or more of the pet treats 100 through the top opening 2a. Obtaining one or more pet treats of the treats 100 is a challenging activity for a pet, which keeps a pet active and healthy.

In at least one embodiment the pet toy or apparatus 1 includes one or more inner balls 8, such as balls 8a and 8b, as shown in dashed lines in FIGS. 1-6, 8-10, and 12. Each of balls 8a and 8b can move freely through the inner chamber 6j of the container section 6 (subject to treats 100, and other inner balls, when the apparatus 1 is assembled as in FIG. 1. Each of balls 8a and 8b can move freely through the inner chamber 4m of the central section 4 (subject to treats 100, and other inner balls), with the inner chambers portions of 4m within components 4d, 4c, and 4b. It is preferred and critical that the component 4d have an inner chamber portion of inner chamber 4m, with an inner diameter D1 shown in FIG. 10, which is less than an outer diameter D2 of each of the balls 8a and 8b. In this manner the balls 8a and 8b cannot escape out of the inner chamber 4m through the opening 4a. The opening 4a typically also has a diameter of D1. The balls 8a and 8b can be taken out of the inside of the apparatus 1 by separating the central section 4 from the container section 6, and taking the balls out through the top opening 6a of the container 6 and/or the bottom opening 4h of the central section 4.

In addition, each outer diameter D2 of each inner ball, of balls 8a and 8b, is preferred to be not more than one half the diameter D3, shown in FIG. 12 of the opening 4h. This allows the balls 8a and 8b to move more freely within the inner chamber portion within section 4f of the central section 4, and within the inner chamber portion within section 6b of the container section 6 (subject to treats 100 and other inner balls), and reduces the possibility that one of the inner balls will effectively clog the opening 4a, and/or the inner chambers 4m or 6j, making it difficult for a pet to obtain one or more treats 100 through the opening 2a.

Generally, the inner balls 8a and 8b serve as obstacles or deterrents to the dispersion of treats 100 out of the assembled apparatus 1 through opening 2a to increase the difficulty of the pet toy and meal feeder or apparatus 1.

The apparatus 1 may include or may have attached thereto a band 10 shown in FIG. 1 by dashed lines, such as similar to a wrist band or top of a sock, which may surround part of the central section 4 and/or the container section 6. It is preferred in at least one embodiment, that the band 10 have a height H1, which about half or more of a height of the central section 4. This is done so that when the apparatus 1, with the band 10, lies horizontally on a ground surface, i.e. with the line xx shown in FIG. 9, parallel to the ground surface, the band 10 will come in contact with the ground surface, such as a floor, to reduce noise of movement of the apparatus 1, when played with by a pet. The entire outer surface of the band 10, in at least one embodiment, should be made of a textile material, rubber, that dampens sound when the band 10 engages with a ground surface, such as a hardwood floor, or other indoor. In at least one embodiment, the band 10 can be slid off of the central section 4 and/or the container section 6. In other embodiments, the band 10 can be glued on or otherwise adhered, such as in a permanent manner to the central section 4. It is preferred that all of central section 4 and all of the container section 6 be transparent, and it is preferred that if a band 10 is used, that the band 10 not cover all of the section 4 and/or 6, so that a pet can see the inner balls 8*a* and 8*b* and/or the treats 100, inside the apparatus 1.

The band 10 serves to reduce the noise of the apparatus 1 on hard flooring and to decrease harm to furniture or other things that the apparatus 1 might come into contact with. In at least one embodiment, the band 10 is used over the junction of the central section 4 and the container section 6 to protect the connection point of sections 4 and 6.

The inner balls 8*a* and 8*b*, may be made of out of plastic, foam or rubber. The inner balls 8*a* and 8*b* are not able to be removed from the inner chambers of the apparatus 1, when the apparatus 1 is assembled.

In one or more embodiments, the inner balls 8*a* and 8*b* may be made of a light material, such as rubber, foam, or plastic that can be removed by a human twisting off the container section 6 from the central section 4. The balls 8*a* and 8*b*, act as a deterrent to too many treats 100 falling out of the inner chambers 4*m* and/or 6*j* of the apparatus 1. Removal of both balls 8*a* and 8*b* makes it easier for the pet to remove food from the inner chambers 4*m* and/or 6*j* of the apparatus 1. Leaving one ball, such as ball 8*a*, in the inner chambers 4*m* and/or 6*j* makes it more difficult, and two balls, 8*a* and 8*b*, make it more challenging.

The container section 6 may also be called a twist and lock cap. The container section 6 may also serve as a measuring cup and may have peripheral lines 6*d* and 6*e*, which are marked with designation "½"and "¼", respectively, as shown in FIG. 12 to measure out a quantity of pet food or treats 100. Once the food or treats 100 is in the cup or container section 6, the container section 6 may be placed on a surface and the top of the container section 6 may be connected to central section 4 by twisting and locking it into place and connecting the sections 4 and 6 together.

The apparatus 1 in accordance with one or more embodiments of the present invention is durable, safe, and easy to use. The container 6 may be a plastic container.

The ball section 2 would typically by a round hollow spherical shell, with an opening 2*a* at the top and an opening 2*c* at the bottom. The ball section may be in the form of a baseball, soccer ball, or other sports ball. The ball section 2 may be other shapes, such as in the form of a football, hockey puck or sports character, or other piece of sporting equipment, such as a baseball glove.

In at least one embodiment, it is critical that the inner diameter D3, shown in FIG. 12, of the central section 4 be at least two times greater than the inner diameter D1 of the opening 4*a*, shown in FIG. 10. This allows inner balls 8*a* and 8*b* to move freely in central section 4 (subject to other balls 8 and treats 100), while not allowing the balls 8 to escape through the opening 4*a*.

All of sections 2, 4, and 6 may be transparent, so that a pet may see treats 100 within the inner chambers 2*d*, 4*m*, and 6*j* of the assembled apparatus 1.

In at least one embodiment, the ball or cap section 2 may have a height H2, the central section 4 may have a height H3 (not including the portion 4*g* which fits into the container section 6), and the container section 6 may have a height H4 as shown in FIG. 3.

In at least one embodiment, the outer peripheral wall 4*f* may have an outer diameter of D5 shown in FIG. 6, which may be about 2.866 inches The outer diameter of the container section 6 may be slightly less than D5. The outer diameter, D6, shown in FIG. 6, of the ball or cap section 2 may be at least three quarters of the outer diameter D5 of the peripheral wall 4*f*. In at least one embodiment, these dimensions are preferred to provide an apparatus 1 which is balanced and stable when the apparatus 1 in the assembled form of FIG. 1, lies flat horizontally on a floor, with the heights H2, H3 and H4, parallel to the floor or ground surface.

In at least one embodiment, the inner diameter D1 of the opening 4*a*, shown in FIG. 10, may be about 0.9 inches. The outer diameter D2 of each ball 8, shown in FIG. 10, may be about 1.0 inches. The opening 2*a* may have an inner diameter which is slightly larger than the inner diameter D1 of the opening 4*a*, to allow treats 100 to more easily come out of inner chamber 2*d*.

In at least one embodiment, the central section 4 may be a hollow bottle or a substantially bottle shaped hollow container with inner chamber 4*m*, whose location is shown in FIG. 10. The height H3 shown in FIG. 3, of the combination of the shoulder portion or section 4*e* and the body portion peripheral wall 4*f* may be H3, which may be about 4.829 inches of which about 3.807 inches may be the height of the peripheral wall 4*f* and 1.022 inches may be the height of the shoulder portion or section 4*e*. In at least one embodiment, it is critical and preferred that the height H4 of the container section 6 be at least half of the height of the peripheral wall 4*f*. For example, the height H4 of the container section 6 may be 2.0 inches while the height of the peripheral wall 4*f* is about 3.807 inches. This provides a large enough measuring cup for container section 6 to provide adequate treats 100 so the inner chambers 6*j* and 4*m* do not have to be frequently reloaded, while also providing adequate space within chambers 6*j* and 4*m* for the treats 100 and the balls 8 to move freely.

In at least one embodiment, the container section 6 may be a hollow cylinder, or substantially a hollow cylinder, with the opening 6*a* at the top and a closed bottom 6*b*. The container section 6 may have a height H4 of 2.0 inches, and an inner diameter of 2.75 inches, for the opening 6*a*.

In at least one embodiment, when the apparatus 1 is assembled as in FIG. 1, the apparatus 1 is completely sealed and/or closed, except for the top opening 2*a*. Each of treats 100 are sized so that they can escape through the opening 2*a*, while each of balls 8 are sized so that they cannot escape through the opening 2*a* and cannot fit into the hollow opening of the neck or portion 4*d*, shown in FIG. 10, so the balls 8 cannot pass from the central section 4 into the inner chamber 2*d* of the ball or cap section 2. In at least one embodiment, the balls 8 can only be taken out of the inner chambers 4*m* and 6*j* of the apparatus 1 by separating the container section 6 from the central section 4. Each of the treats 100 can be taken out of the any of the inner chambers 2*d*, 4*m*, or 6*j* by manipulation, shaking, or movement of the assembled apparatus 1 to dispense the treats 100 from the opening 2*a*. The treats 100 can also be taken out from the inner chambers 2*d*, 4*m*, or 6*j* by detaching the ball or cap section 2 from the central section 4, and removing the treats 100 through the opening 4*a* or by detaching the container section 6 from the central section 4 and removing from the opening 4*h* of the central section or the opening 6*a* of the container section 6.

In at least one embodiment, the band or sleeve 10 is preferred to be elastic, so that an inner diameter of the sleeve 10 is stretched to place the sleeve 10 on and around the central section 4 and/or the container section 6, as in FIG. 1, in order to hold the sleeve 10 tightly to and in place on the apparatus 1.

The portion or ridge 4c, in at least one embodiment, is flat an at an angle of 0 degrees with respect to a ground surface, from left to right, when the assembled apparatus 1 is upright, so that heights H2, H3, and H4 shown in FIG. 3, are perpendicular to a ground surface. I.e. in at least one embodiment, the portion or ridge 4c is not a spiral or elevated ridge on which a cap is screwed on. In order to attach the ball section 2 to the top of the central section 4, the ball section, which is elastic and can be deformed, is configured to be pushed onto the central section 4 causing the ridge 4c, which spans an outer circular region of the central section 4 to be forced into a slot 2e which spans an inner circular region of the ball section 2. The ball section 2 can thus be connected to the central section 4, without rotating the ball section 2. A screw on cap of ball section 2 is not optimum, because a pet may be able to rotate it off of the central section 4.

In at least one embodiment, the ball section 2 is substantially spherical but not completely spherical, and it is preferred that the ball section 2 have a flat top and a flat bottom as shown in FIG. 3. The flat bottom allows the ball or cap section 2 to be more stable and inhibits the ball or cap section 2 from breaking when it is connected to the central section 4. The flat bottom of the ball or cap section 2 may span, contact, and/or rest on the shoulder portion 4e of the central or bottle section 4 as shown by FIGS. 3 and 11.

In one or more embodiments, the inner balls 8, such as inner balls 8a and 8b, may be or may be replaced by inner objects having any shape, whose largest dimension is larger than the inner diameter D1 of the opening 4a of the bottle or central section 4, so that the inner objects cannot escape the central or bottle section 4 through the opening 4a, but rather can only escape from the combination of the central section 4 and the container 6, by disconnecting the central section 4 and the container section 6. The inner objects, similar to inner balls 8, but of any shape, typically move freely within the combination of inner chambers 4m and 6j, when the apparatus 1 is assembled as in FIG. 1.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a cap section;
a central section;
a container section; and
a first inner object;
wherein the cap section is configured to removably attach to a first end of the central section;
wherein the container section is configured to removably attach to a second end of the central section, wherein the second end of the central section opposes the first end of the central section;
wherein the first inner object is configured so that the first inner object does not fit through a first opening of the central section and when the first inner object is within either an inner chamber of the container section or an inner chamber of the central section, and the cap section, the central section, and the container section are assembled so that the cap section is attached to the central section and the container section is attached to the central section, the first inner object cannot be removed from inside the assembled cap section, central section, and container section, and does not protrude out from the assembled cap section, central section, and container section, without taking the assembled cap section, central section, and container section apart or breaking the assembled cap section, central section, and container section;
wherein the first inner object is configured to fit through a second opening of the central section into the inner chamber of the central section;
wherein the first opening of the central section is located at the first end of the central section;
wherein the second opening of the central section is located at the first second end of the central section;
wherein the container section has an opening through which pet food treats can be inserted to place the pet food treats into the inner chamber of the container section, when the container section is separated from the central section;
wherein the container section is configured so that when the container section is attached to the second end of the central section, pet food treats cannot be inserted into the inner chamber of the container section without first passing through the first opening of the central section, through the inner chamber of the central section, and through the second opening of the central section; and
wherein the container section is a measuring cup, having a closed bottom opposite the opening of the container section.

2. The apparatus of claim 1 wherein
the first inner object is a first inner ball made of at least one of plastic, foam, or rubber.

3. The apparatus of claim 2 further comprising
a plurality of pet food treats; and
wherein each of the plurality of pet food treats is configured to fit through the first opening of the central section.

4. The apparatus of claim 1 further comprising
a sleeve which is configured to surround the central section, and to inhibit a portion of the central section from contacting a floor surface; and
wherein the sleeve is made of a material that dampens sound when the sleeve engages with a ground surface.

5. The apparatus of claim 4 wherein
when the sleeve is attached to the central section, the apparatus is configured to lie horizontally on a ground surface, with the sleeve in contact with the ground surface, such that a line passing through a center of the apparatus is parallel to the ground surface; and
wherein the sleeve is configured to cover and protect the junction of the central section and the container section when the container section is connected to the central section.

6. The apparatus of claim 1 wherein
the cap section is shaped substantially in the form of a spherical shell, which is made of a flexible, resilient material, which allows the cap section to be snapped or flexed onto first end of the central section; and
and wherein the cap section has a flat top and a flat bottom.

7. The apparatus of claim 6 wherein
the cap section has an inner chamber having an inner diameter which is greater than a diameter of the first opening of the central section.

8. The apparatus of claim 1 wherein
the first inner object has a largest dimension which is less than half of an inner diameter of the inner chamber of the container section.

9. The apparatus of claim 4 4 wherein
the sleeve has a height when attached to and surrounding the central section, such that the height of the sleeve is at least half of the height of the central section from the first end of the central section to the second end of the central section.

10. The apparatus of claim 1 wherein
a diameter of the first opening of the central section is less than half a diameter of the first second opening of the central section;
wherein the first inner object is a first inner ball made of at least one of plastic, foam, or rubber:
the apparatus further comprising a second inner object:
wherein the second inner object is configured so that the second inner object does not fit through the first opening of the central section and when the second inner object is within either an inner chamber of the container section or an inner chamber of the central section, and the cap section, the central section, and the container section are assembled so that the cap section is attached to the central section and the container section is attached to the central section, the second inner object cannot be removed from inside the assembled cap section, central section, and container section, and does not protrude out from the assembled cap section, central section, and container section, without taking the assembled cap section, central section, and container section apart or breaking the assembled cap section, central section, and container section;
wherein the second inner object is configured to fit through the second opening of the central section into the inner chamber of the central section; and
wherein the second inner object is a second inner ball made of at least one of plastic, foam, or rubber.

11. The apparatus of claim 6 wherein
the central section has a single ridge located at the first end; and
wherein the cap section is configured to attach to the first end of the central section by a slot of the cap section mating with the single ridge, by pushing the cap section onto the central section, without rotating the cap section with respect to the central section; and
wherein the single ridge is a circular ridge which is at an angle of zero degrees with respect to the closed bottom of the container section.

12. The apparatus of claim 5 1 wherein
the container section has a height; and
wherein the central section has a cylindrical portion having a height, which is aligned with the height of the container section when the container section is attached to the second end of the central section; and
wherein the height of the container section is at least half of the height of the cylindrical section of the central section.

13. An apparatus comprising:
a cap section;
a central section; and
a container section; and wherein the cap section is configured to removably attach to a first end of the central section;
wherein the container section is configured to removably attach to a second end of the central section, wherein the second end of the central section opposes the first end of the central section;
wherein the container section is a measuring cup;
wherein the central section is a bottle having a neck with a first opening at the first end of the central section, and a second opening at the second end of the central section, and an inner chamber between the first opening of the central section and the second opening of the central section;
wherein the central section has a cylindrical section between the first and second ends of the central section, wherein the cylindrical section of the central section has an outer diameter; and
wherein the cap section has an outer diameter which is at least three quarters the outer diameter of the cylindrical section of the central section;
wherein the container section has an opening through into which pet food treats can be inserted to place the pet food treats into an inner chamber of the container section, when the container section is separated from the central section;
wherein the container section is configured so that when the container section is attached to the second end of the central section, pet food treats cannot be inserted into the inner chamber of the container section without first passing through the first opening of the central section, through the inner chamber of the central section, and through the second opening of the central section and
wherein the container section is a measuring cup, having a closed bottom opposite the opening of the container section.

14. The apparatus of claim 13 wherein,
the container section has a height; and
wherein the central section has a cylindrical section having a height, which is aligned with the height of the container section when the container section is attached to the second end of the central section; and
wherein the height of the container section is at least half of the height of the cylindrical section of the central section.

15. A method comprising:
placing a plurality of pet food treats into a container section, wherein the container section is a measuring cup;
removably attaching the measuring cup to central section, wherein the central section is a bottle, with a neck at a first end and a bottom at a second end, such that the measuring cup is attached to the second end of the central section, and wherein the central section has a first opening at the first end of the central section, and a second opening at the second end of the central section;
wherein the container section, and the central section are part of an apparatus further comprising a cap section and a first inner object;
wherein the cap section is configured to removably attach to the first end of the central section;
wherein the second end of the central section opposes the first end of the central section;
wherein the first inner object is configured to fit through the second opening of the central section into an inner chamber of the central section;

wherein the first inner object is configured so that the first inner object does not fit through the first opening of the central section and when the first inner object is within either an inner chamber of the container section or the inner chamber of the central section, and the cap section, the central section, and the container section are assembled so that the cap section is attached to the central section and the container section is attached to the central section, the first inner object cannot be removed from inside the assembled cap section, central section, and container section, and does not protrude out from the assembled cap section, central section, and container section, without taking the assembled cap section, central section, and container section apart or breaking the assembled cap section, central section, and container section;

wherein the container section has an opening through into which pet food treats can be inserted to place the pet food treats into the inner chamber of the container section, when the container section is separated from the central section;

wherein the container section is configured so that when the container section is attached to the second end of the central section, pet food treats can not be inserted into the inner chamber of the container section without first passing through the first opening of the central section, through the inner chamber of the central section, and through the second opening of the central section; and wherein the container section is a measuring cup, having a closed bottom opposite the opening of the container section.

16. The method of claim 15 further comprising placing one or more inner objects into the measuring cup before removably attaching the measuring cup to the second end of the central section;

and wherein each of the one or more inner objects has a largest outer dimension which is larger than a first opening at the neck at the first end of the central section so that each of the one or more inner objects cannot pass through the first opening at the neck at the first end of the central section;

and wherein each of the plurality of pet food treats is dimensioned so that each of the plurality of pet food treats can pass through the first opening at the neck at the first end of the central section.

17. The method of claim 15 further comprising placing a sleeve so that the sleeve surrounds the central section, and inhibits a portion of the central section from contacting a floor surface.

18. The method of claim 15 further comprising removably attaching a cap section to the first end of the central section, which is opposite the second end of the central section.

19. The method of claim 18 wherein the cap section is shaped substantially in the form of a spherical shell.

20. The method of claim 19 wherein the cap section has an inner chamber having an inner diameter which is greater than a diameter of the first opening of the central section.

21. The method of claim 16 wherein each of the one or more inner objects has a largest outer dimension which is less than half of an inner diameter of the inner chamber of the container section.

\* \* \* \* \*